(12) United States Patent
Marsh (10) Patent No.: US 6,598,487 B1
(45) Date of Patent: Jul. 29, 2003

(54) MAGNETIC FLOWMETER HAVING A SEPARABLE MAGNET/ELECTRODE ASSEMBLY

(75) Inventor: Lawrence B. Marsh, Buckeystown, MD (US)

(73) Assignee: Marsh-McBirney, Inc., Frederick, MD (US)

(*) Notice: Subject to any disclaimer, the term of this patent is extended or adjusted under 35 U.S.C. 154(b) by 0 days.

(21) Appl. No.: 10/147,858

(22) Filed: May 20, 2002

(51) Int. Cl.⁷ .............................................. G01F 1/58
(52) U.S. Cl. .................. 73/861.12; 73/861.11
(58) Field of Search .................. 73/861.12, 861.11, 73/861.15, 861.16, 861.17

(56) References Cited

U.S. PATENT DOCUMENTS

| | | |
|---|---|---|
| 3,372,589 A | 3/1968 | Mannherz |
| 3,813,938 A * | 6/1974 | Grosch et al. ............ 73/861.12 |
| 3,885,433 A | 5/1975 | Marsh |
| 4,083,246 A | 4/1978 | Marsh |
| 4,195,515 A | 4/1980 | Smoll |
| 4,346,604 A | 8/1982 | Snook |
| 4,459,858 A | 7/1984 | Marsh |
| 4,507,975 A * | 4/1985 | Bittner et al. ............ 73/861.12 |
| 5,398,552 A | 3/1995 | Marsh |

* cited by examiner

*Primary Examiner*—Edward Lefkowitz
*Assistant Examiner*—Takesha S Miller
(74) *Attorney, Agent, or Firm*—Lawrence E. Laubscher, Sr.

(57) ABSTRACT

Apparatus for measuring the rate of flow of a fluid in a conduit includes a receptor assembly arranged on the external surface of the conduit, and a removable external connector assembly including an electromagnet for establishing a magnetic field that extends transversely across the conduit, and a plurality of circumferentially arranged electrodes that are insertable into direct contact at their tips with the fluid in the conduit via sealable gland passages contained in the receptor assembly. A calibration adjustment arrangement is provided for adjusting the calibration factor of the flow signal processing system as a function of the conduit cross-sectional area. In a first embodiment, the glands are self sealable, whereupon the gland passages are automatically closed when the electrodes are removed therefrom. In another embodiment, the gland passages are normally open and are formed in a compressible resilient gland body, whereby radial inward compression of the gland body effects closure of the gland passages. According to a further embodiment, a valve arrangement is provided for opening and closing the gland passages.

16 Claims, 8 Drawing Sheets

MAGNETIC FLOWMETER HAVING A SEPARABLE MAGNET/ELECTRODE ASSEMBLY

BACKGROUND OF THE INVENTION

1. Field of the Invention

A magnetic flowmeter for measuring the rate of flow in a liquid includes receptor means associated with the conduit, and connector means removably connected with the receptor means, said connector means containing an end-fire electromagnet for generating a magnetic flux field transversely across the conduit, and a plurality of parallel spaced sensing electrodes that extend through sealable gland passages contained in said receptor means for direct engagement at their end tips with the fluid that flows through the conduit. The electrodes are connected with flow signal processing means that include calibration factor adjustment means that are adjusted as a function of the size of the-cross-sectional area of the conduit.

2. Brief Description of the Prior Art

Flow meters for measuring the rate of flow of a fluid in a conduit are well known in the patented prior art, as shown by the Applicant's prior U.S. Pat. Nos. 3,885,433, 4,083,246, 4,459,858 and 5,398,552.

In the known Faraday-type electromagnetic flow meters, a transverse magnetic field is established in a direction normal to the longitudinal axis of a conduit, and a pair of electrodes in contact with the fluid within the conduit are diametrically arranged along a line normal both to the magnetic field and to the longitudinal axis of the conduit, whereby the velocity of flow is measured by a meter as a function of the potential difference across the electrodes.

In the prior patent to Mannherz, U.S. Pat. No. 3,372,589, a side saddle magnetic flow meter is disclosed in which the magnetic field is produced within a relatively large pipe in a region which represents only a portion of the total cross-sectional area thereof. In order to provide an accurate reading of the flow rate through the pipe, the voltage induced in the region produces a signal that is multiplied by a factor that depends on the dimensional relationship of the region to the total cross-sectional area of the pipe. In the patent to Smoll, U.S. Pat. No. 4,195,515, a medical-type flow meter system is disclosed in which an electromagnetic assembly is removably connected by connector means with a tubular member having electrodes mounted in a common transverse plane in contact with the fluid (i.e., blood) flowing through the tabular member. By using a plurality of tubular parts in an extracorporeal circuit, measurements can be made at different points is the circuit.by moving the magnet structure part from one tubular part to another.

The Snook, et al., U.S. Pat. No. 4,346,604 discloses a medical electromagnetic flow meter having interchangeable housings and/or magnetic structures, use being made of alignment lugs that automatically effect a desired position and orientation of the lumen and electrode system relative to the magnetic structure., The reluctance of the magnetic circuit may be selectively altered by changing the position of an adjustment keeper, or a Hall probe may be provided for detecting the produced field and for increasing or decreasing the field strength to maintain predetermined values.

The aforementioned Marsh U.S. Pat. No. 4,459,858 discloses a flow meter having an electromagnetic probe which is characterized by said probe being mounted within an opening contained in the conduit for generating electrical signals as a function of the velocity of fluid flow. The probe has a debris shedding head portion which protrudes into the interior of the conduit and includes an electromagnet for generating an electromagnetic field in the fluid, the axis of the field extending normal to the direction of fluid flow. The probe further includes a plurality of electrodes arranged beyond the poles of the electromagnet and adjacent the fluid for producing the electrical signals in response to the flow of fluid through the electromagnetic field. Signal processing apparatus is connected with the sensor probe for converting the electrical signals into a flow velocity output signal. The Marsh U.S. Pat. No. 5,398,552, discloses a magnetic flow meter that has a separable magnet assembly that can be joined with a flow tube having a plurality of electrodes embedded within the flow tube. The flow tube is connected in fluid conducting relation between a pair of axially spaced sections of conduit, a first electrical connector being fixed to the outer surface of the flow tube and including first terminals electrically connected with spaced internal electrodes, respectively, that contact the fluid flowing through the tube. A second electrical connector is provided for separable connection with the first connector, which second connector includes an end-fire electromagnet for establishing a transverse magnetic field in the flow tube via the first connector, and second terminals for connecting the electrodes with a flow indicating meter via the first terminals, respectably, and a cable. In order to calibrate the meter for use with flow tubes having different internal cross-sectional dimensions, respectively, the first and second connectors are provided with cooperating size coding and decoding devices, respectively.

As distinguished from medical-type instruments for measuring the flow of blood, in the field of industrial process fluid flow such water-supply and waste-fluid removal flow measurement, the conduits are of relatively large size, and it is expensive to provide for each installation a separate flow-indicating meter that is calibrated in accordance with the size of the conduit. Furthermore, pipes or conduits of different internal dimensions have different flow characteristics, owing for example, to the high velocity of fluid flow near the center of the conduit, and a slower velocity near the wall of the conduit where the electrodes are relatively close to each other, so that the sensed velocity is not equal to the average or mean velocity of the flowing fluid. Additionally, as the fluid flows at a variety of velocities, this relationship between the sensed velocity and the mean velocity changes as a finction of fluid velocity. Therefore, for reasonable accuracy there must be an ability to establish a fixed gain multiplier for each pipe size as it relates to sensed velocity vs. mean velocity, and there must be additionally, for situations where higher accuracies are required the ability to have an addition correction factor multiplier that is a function of the velocity of the fluid.

Furthermore, the use of a probe with removable electrodes bypasses the problem of electrode fouling that could occur with the Marsh U.S. Pat. No. 5,398,552. Furthermore, having the small diameter electrodes as the only part of the assembly that must be inserted against the pressure of the contained fluid, allows for the use of the flow meter without a need for elaborate insertion hardware as in other insertible designs such as Marsh U.S. Pat. No. 4,459,858.

Accordingly, the present invention was developed to provide an improved flow-measuring system wherein a single flow-indicating meter and electrode/magnet assembly may be used to provide accurate flow measurements of fluid flow in a large number of conduits having different internal cross-sectional dimensions.

SUMMARY OF THE INVENTION

Accordingly, a primary object of the present invention is to provide an improved flowmeter including receptor means arranged on the outer circumferential surface of the conduit, and connector means removably connected with the receptor means, said connector means containing an end-fire electromagnet for establishing a magnetic field transversely across the conduit, and a plurality of parallel spaced sensing electrodes that extend through sealable gland passages contained in said receptor means, the tips of the electrodes being in direct contact with the fluids flowing in the conduit. The other ends of the electrodes are connected with flow signal processing means that include calibration factor adjustment means that are adjusted as a function of the cross-sectional area of the conduit.

Another object of the present invention is to provide an electromagnetic flow meter that is automatically calibrated for conduit size upon connection with any one of a plurality of conduits having different internal cross-sectional dimensions, respectively.

A more specific object of the invention is to provide an electromagnetic flow measuring system-including a flow tube that is connected in flow-transmitting relation between a pair of axially spaced sections of the conduit, including self-sealing glands and a second separable magnet/electrode assembly with a plurality of electrodes that can be easily inserted through the self-sealing access ports so as to make contact with the fluid contained within a pressurized flow tube, and an attached flow indicating meter for displaying the flow.

According to another object of the invention, both the flow tube and the magnet/electrode assembly are equipped with pipe size identifying means that provide for automatically calibrating the meter as a function of the internal cross-sectional dimensions of the associated flow tube. The code means may comprise spaced contacts on both the flow tube and the magnet/electrode assembly, the spacing arrangement which correspond with the cross-sectional dimensions of the flow tube, so that each spacing uniquely defines a particular flow tube size. Alternately, the code means may comprise an electronic chip embedded within the flow tube and a "chip reader" that is part of the magnet/electrode assembly. Other alternate means of coding are electrical terminals on one connector that are read by corresponding code-reading terminals on the other connector. Alternately, the calibration means may simply consist of a size identifying number imprinted on the flow tube where said size identifying number is manually inputted into the flow meter computing electronics via a local user interface.

According to a further object of the invention, the transverse magnetic field in the flow tube is produced by an end-fire electromagnet mounted in the magnet/electrode assembly to direct flux that is generally normal to the longitudinal axis of the conduit.

Another object of the invention is allow the flow tube self-sealing glands to be penetrated by temperature and pressure probes so that, in addition to flow, a measurement of both the pressure and the temperature of the fluid within the flow tube can be made by probes directly in contact with the fluid.

BRIEF DESCRIPTION OF THE DRAWINGS

Other objects and advantages of the invention will become apparent from the following specification, when viewed in the light of the accompanying drawings, in which.

DETAILED DESCRIPTION

Referring first more particularly to FIGS. 1–4, in the prior Marsh U.S. Pat. No. 5,398,552, the known Faraday-type flow measuring system of FIG. 1 for measuring the flow F of fluid in a conduit 2 includes a pair of electrodes 4 and 6 arranged diametrically of the conduit and normal to the magnetic field β that extends transversely of the conduit. The flowmeter measures the potential difference across the electrodes, thereby affording an indication of the velocity of fluid flow.

Figure 1:
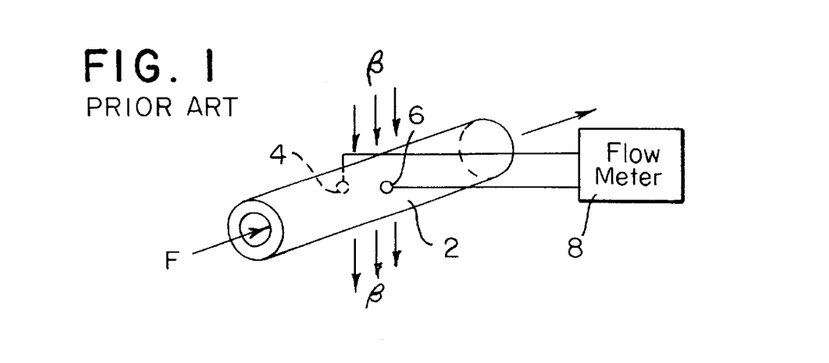
FIGS. 1 and 2 are diagrammatic views illustrating an electromagnetic flowmeter of the prior art.
Figure 2:
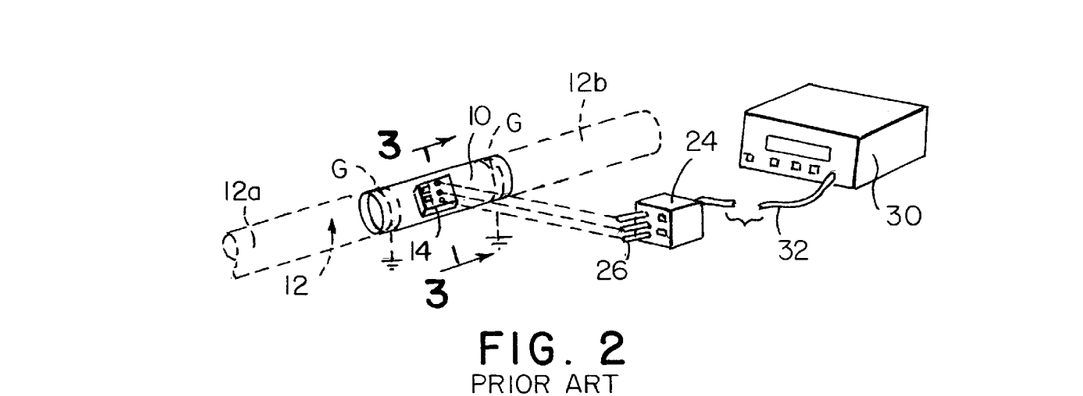
Figure 3:
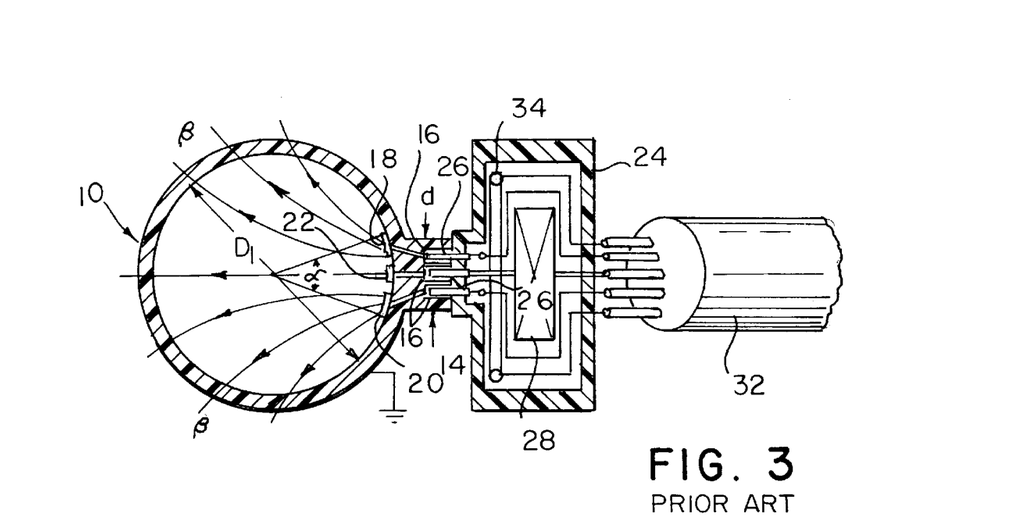
FIG. 3 is a sectional view taken along line 3—3 of FIG. 2.

In the embodiment of FIG. 2, a flow tube section 10 is connected between the axially spaced sections 12a and 12b of the conduit 12, a first electrical connector 14 being mounted on the outer surface of the flow tube section 10. As shown in FIG. 3, a first electrical connector 14 is mounted on the outer surface of the conduit, and includes first terminals 16 electrically connected with spaced integral electrodes 18, 20, and 22 that contact the fluid flowing in the conduit. A second electrical connector 24 is separably connected with the first connector 14, which second connector contains an end-fire electromagnet 28 for establishing the transverse magnetic field β in the conduit, and a plurality of second terminals 26 for connecting the first terminals with the flowmeter 30 via the cable 32. In order to calibrate the meter for use with a plurality of flow tubes having different cross-sectional dimensions, the first and second connectors are provided with cooperating size coding and decoding devices, respectively.

Figure 4:
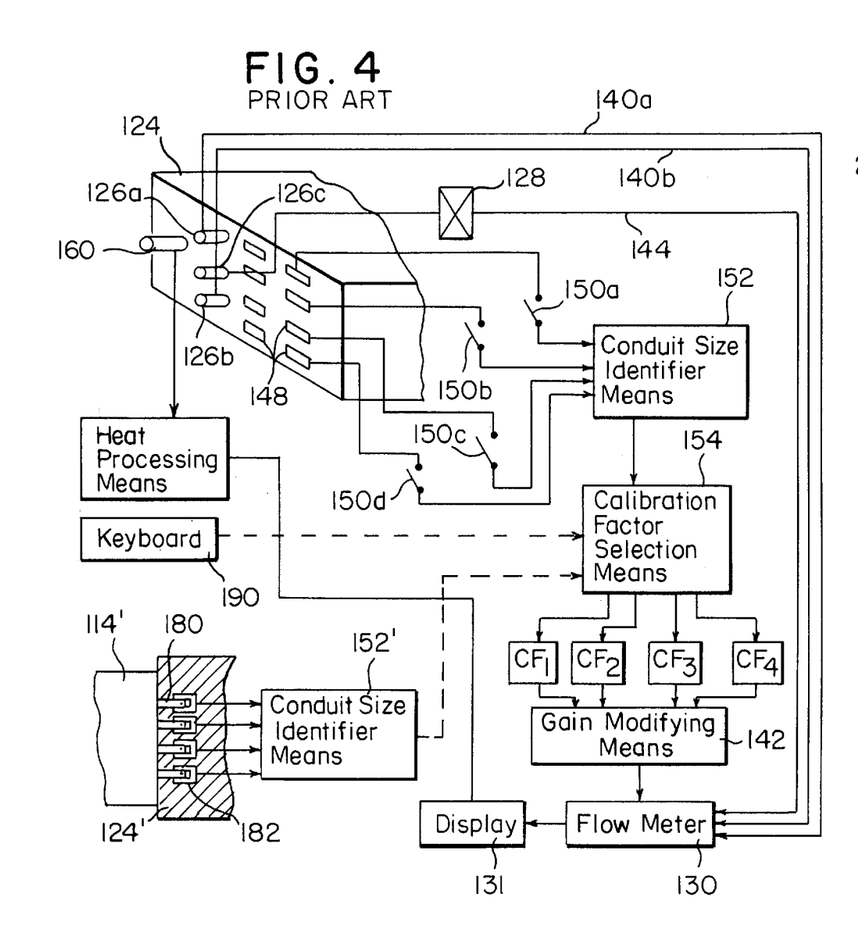
FIG. 4 is a circuit diagram of the prior art system of FIG. 2.

As shown in the aforementioned Marsh U.S. Pat. No. 5,398,552, the first electrical connector means mounted on the flow tube is provided with a plurality of stationary code tabs the arrangement of which corresponds with the internal cross-sectional dimensions of the flow tube. Similarly, as shown in FIG. 4, the corresponding end face of the second electrical connector 124 contains a plurality of openings 148 for receiving the code tabs 146 respectively, thereby to operate the appropriate normally-open switches 150a, 150b, 150c, 105d that are connected with the conduit size identifier means 152. In accordance with the size of the conduit determined by the conduit size identifier means 152, the calibration factor selector means 154 connects a corresponding calibration factor device $CF_1$, $CF_2$, $CF_3$, or $CF_4$, with the flowmeter 130 via gain modifying means 142, thereby to automatically calibrate the flowmeter 130 in accordance with the internal cross-sectional dimensions of the associated flow tube 110. If desired, a heat-sensing probe 160 may be provided on a second connector 124 that extends within a corresponding female receptacle 162 that is connected in heat-transmitting relation with a thermal probe that is in contact with, and sensitive to the temperature of, the fluid flowing through the flow tube 110. Thus, the heat of the fluid as sensed by the probe 164 is transmitted by the male member 160 to the heat processing means 166, which sends the appropriate heat-responsive signal to the display 131 to adjust correspondingly the reading of the flow meter 130.

Figure 5:
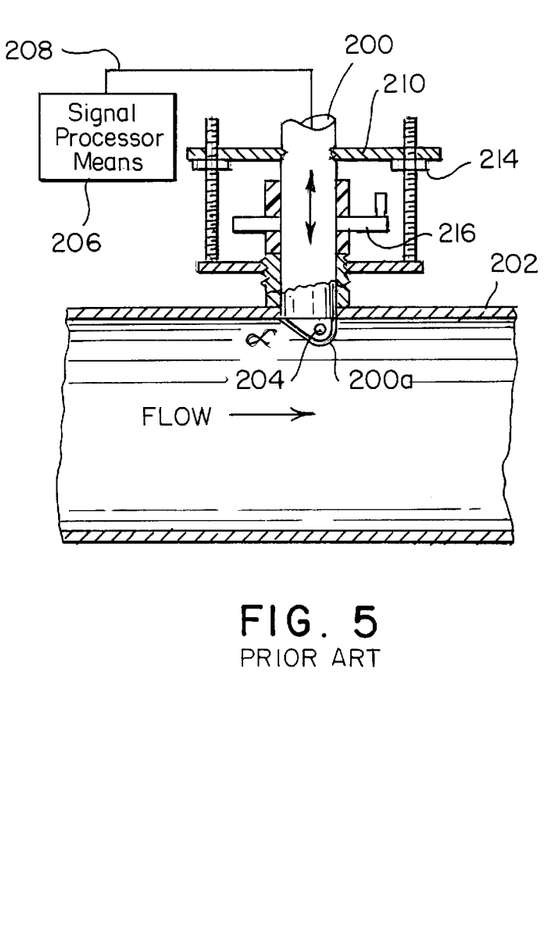
FIG. 5 is a sectional view of an invasive probe arrangement of another prior art flowmeter.

Referring now to the prior art embodiment of FIG. 5, the electromagnetic probe. sensor 200 has a tip portion 200a that extends into the conduit 202 through a radial opening contained in the wall thereof for direct engagement with the fluid flowing therethrough. The probe includes a pair of sensing electrodes 204 that are connected with the flow signal processing means 206 by means of cable 208. An end-fire electromagnet (not shown) is contained within the probe body for generating a flux field that extends transversely across the conduit—i.e., generally normal to the longitudinal axis of the conduit. The insertion probe is provided with rather complicated mounting hardware that allows the sensor probe to be inserted into the conduit without stopping the flow of fluid through the conduit., More particularly, the probe body is carried by an end plate 210 that is vertically displaceable by means of threaded bolts 212 and nuts 214. Rotary valve means 216 close the probe opening as the probes removed, and sealing gland means 218 further seal the opening. It is important to note that owing to the size of the opening in the conduit wall, a substantial amount of force is required to insert the probe into the opening against the fluid pressure force. Furthermore, upon withdrawal of the probe, a substantial amount of sealing force is required.

Figure 6:
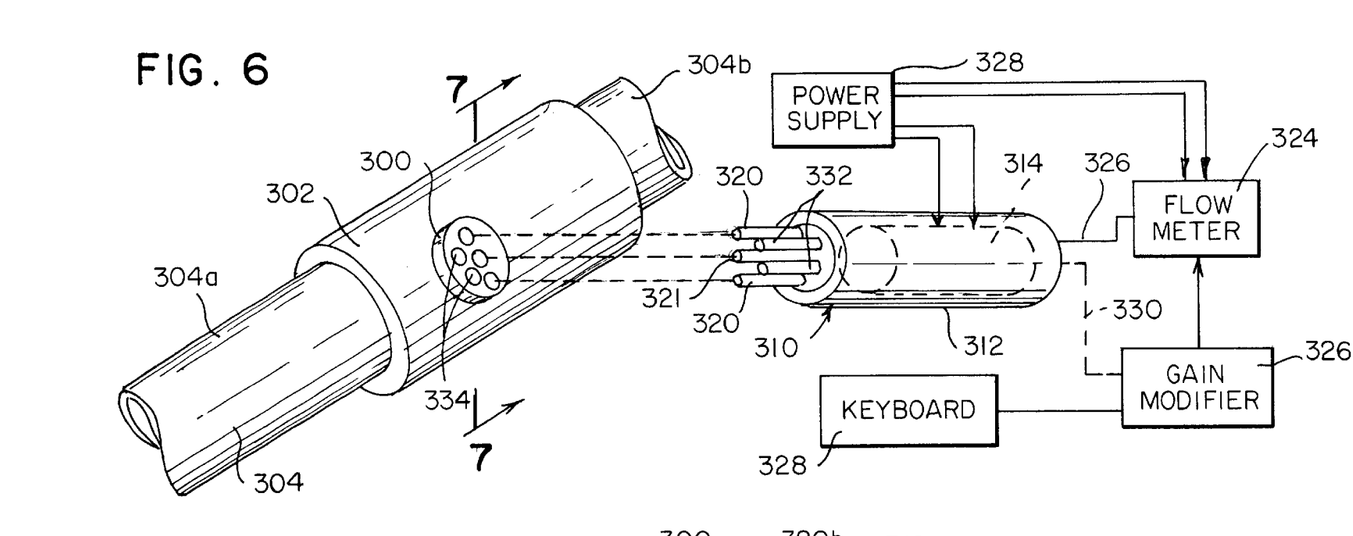
FIG. 6 is an exploded perspective view of the improved self-sealing invasive flowmeter of the present invention.
Figure 7:
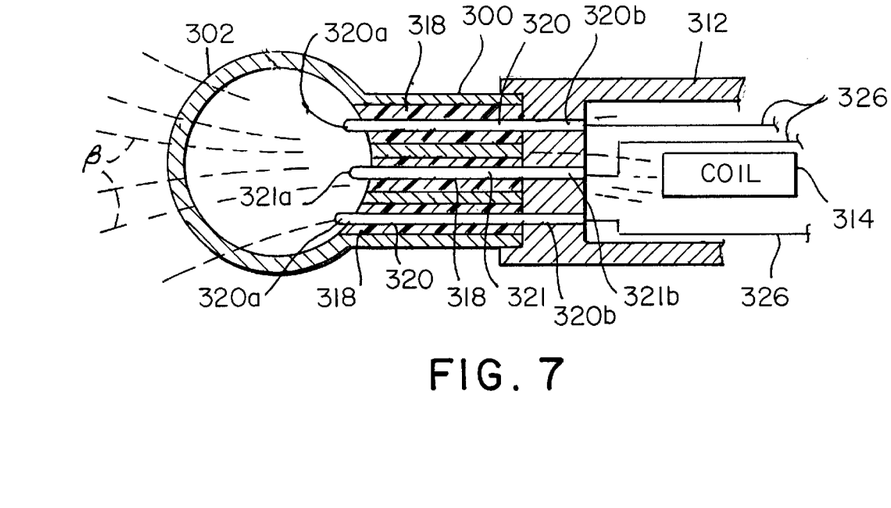
FIG. 7 is a sectional view taken along line 7—7 of the assembled embodiment of FIG. 6.
Figure 8:
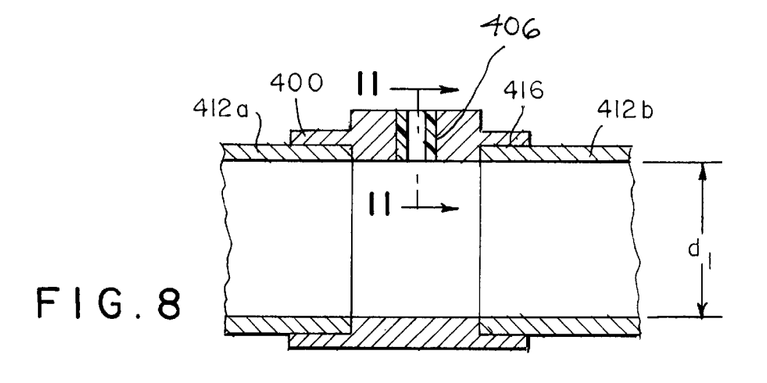
FIGS. 8–10 are detailed sectional views of applications of the invention of FIGS. 6 and 7 as applied to conduits of varying sizes, respectively.
Figure 9:
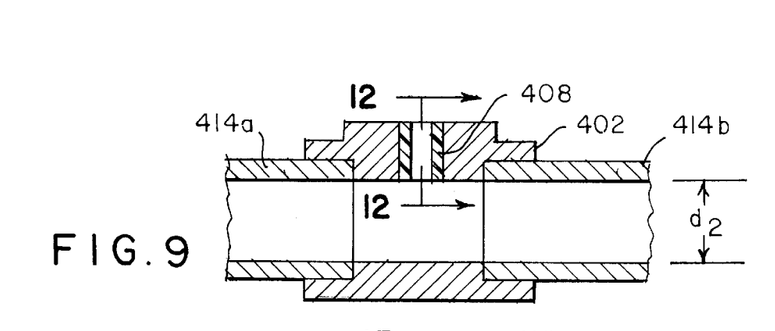
Figure 10:
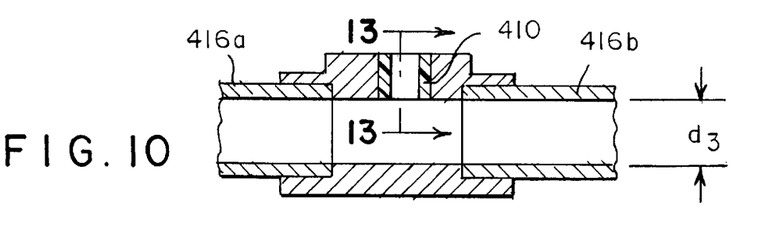
Figure 11:
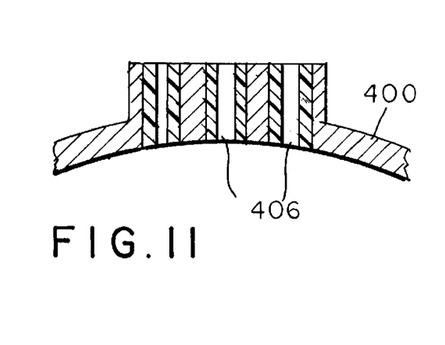
FIGS. 11–13 are sectional views taken along lines 11—11, 12—12 and 13—13 of FIGS. 8–10, respectively.
Figure 12:
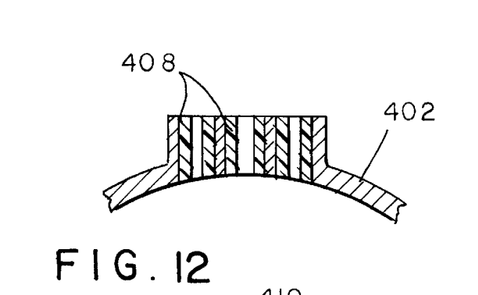
Figure 13:
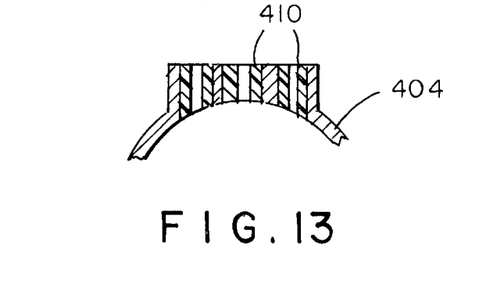

According to the present invention as shown in FIGS. 6 and 7, receptor means 300 are carried by the outer circumferential.surface of a tubular section 302 that is inserted between and in communication with the sections 304a and 304b of the conduit 304. Separable connector means 310 are provided that include a connector body 312 containing the end-fire electromagnet 314 that produces the magnet flux β that extends transversely of the conduit, as shown in FIG. 7. The receptor means contains a plurality of resilient tubular self-sealing glands 318 mounted in parallel though bores contained in the receptor means 300. Removably extending through the glands 318 are a plurality of parallel sensing electrodes 320 and ground electrode 321 having first end extremities or tips 320a, 321a that are in direct communication with the fluid flowing though conduit 302. The other ends 320b, 321b of the electrodes are carried by the connector body 312 and are electrically connected with the flow meter 324 by conductors 326. Power supply means 328 provides power to the electromagnetic coil 314 and to the flow meter 324.

In accordance with an important feature of the invention, the flow meter 324 includes calibration factor adjustment means 326 in the form of a gain modifier that may be manually adjusted by keyboard means 328 in accordance with the cross-sectional dimensions of the conduit 304 as determined from visible indicia on the outer surface thereof. Alternatively, the gain modifier may be adjusted by a signal supplied by conductor 330 as determined by coding electrodes 332 that engage corresponding openings 334 in the receptor means to read memory chips carried by the receptor means that are characteristic of the size of the cross-sectional dimensions of the conduit. As distinguished from the prior art embodiment of FIG. 5 having a relative large wall opening requiring great resistance to the fluid pressure force, owing to the relative small diameters of the sensing electrodes (on the order of 0.1 inch), the force resisting the pressure force of the fluid is much smaller according to the invention of FIGS. 6 and 7. In fact, a 1 inch probe would require 100 times the force of a 0.1 inch probe. Thus, the present invention affords the advantage that owing to the insertion of electrodes having only small diameters into the self-sealing gland passages, the insertion of the electrodes can be achieved without expensive valve arrangements and associated hardware, thereby avoiding the safety concerns that are present when large probes are inserted into high pressure lines.

Referring now to FIGS. 8–13, there are illustrated three receptor sections 400, 402, and 404 having progressive decreasing diameters $d_1$, $d_2$, and $d_3$, respectively; In these conduits, the circumferential spacing distance between the glands 406, 408, and 410 progressively decreases, respectively. The tubular receptor sections 400, 402, and 404 are-connected between, and are in communication with, the conduit sections 412a, 412b; 414a, 414b; and 426a, 416b, respectively.

Figure 14:
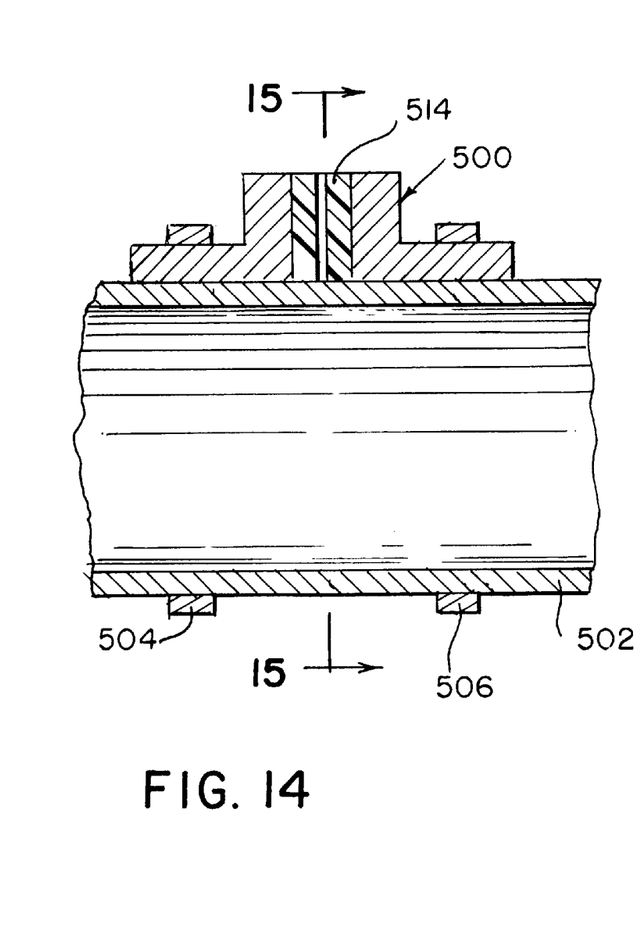
FIG. 14 is a sectional view of a modification of the invention of FIGS. 6 and 7.
Figure 15:
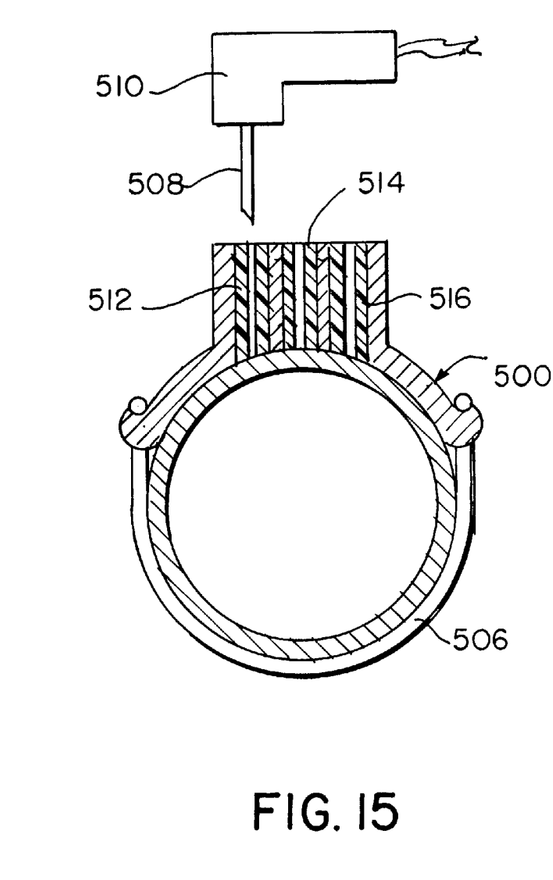
FIG. 15 is a sectional view taken along line 15—15 of FIG. 14.

Referring now to FIGS. 14 and 15, the receptor means may be in the form of a separate receptor body 500 that is mounted externally of the unitary conduit 502 by a pair of circumferentially extending straps 504 and 506. After the receptor body is rigidly mounted in place (as best shown in FIG. 15), access holes are drilled through the wall of the conduit by inserting the bit 508 of a drill 510 through the passages of the self-sealing resilient glands 512, 514, and 516, respectively.

Figure 16:
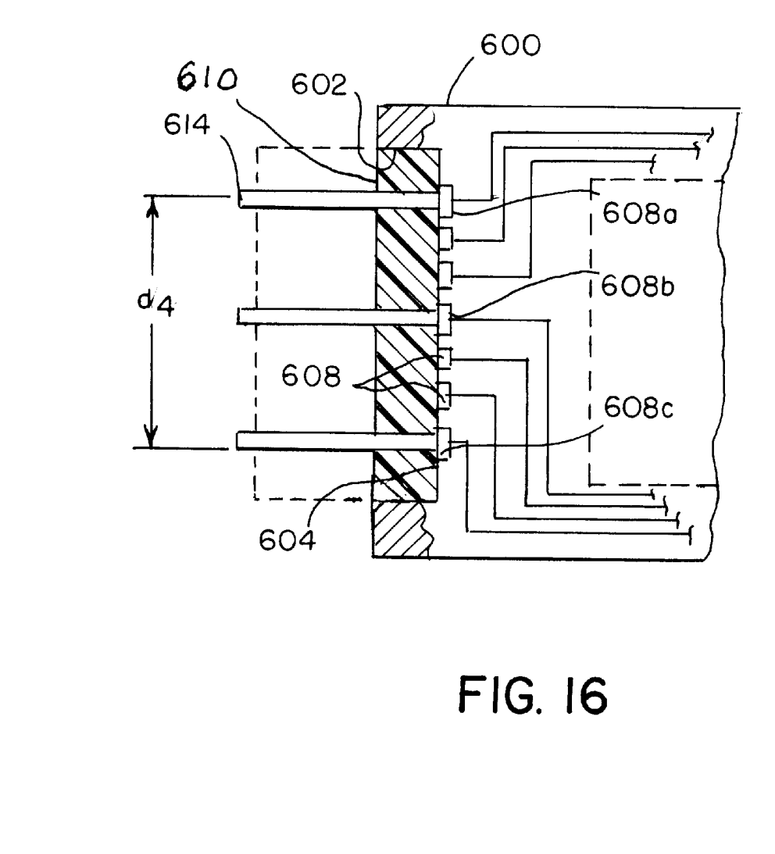
FIGS. 16 and 17 are detailed sectional views illustrating coding arrangments for us with conduits having diameters of different sizes, respectively.
Figure 17:
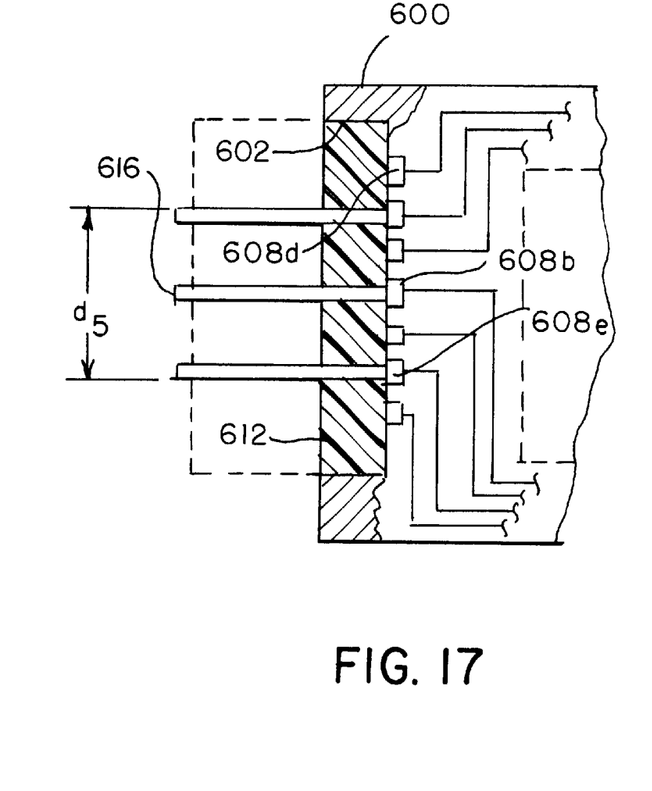

Referring now to FIGS. 16 and 17, a coding arrangement is illustrated wherein the gain modifier means of the flow meter is adjusted in accordance with the size of the conduit that contains the fluid being measured. In the illustrated embodiment of connector body 600 contains at one end a recess 602 having a bottom wall 604 that supports a plurality of aligned laterally-spaced electrical contacts 608 that are connected with the respective gain modifying means of the flow meter. Electrode support members 610 (FIG. 16) and 612 (FIG. 17) are insertable within the connector body recess 602, which support members carry spaced electrodes 614 and 616 having spacing distances $d_4$ and $d_5$ that correspond with the size of the fluid conduit. In the FIG. 16 illustration, the electrodes 614 carried by the electrode support body 610 engage a first set of contacts 608a, 608b, and 608c to effect a first gain modification corresponding to a conduit having a large cross-sectional area, and in the FIG. 17 embodiment, the electrodes engage a second set of contacts 608d, 608b, and 608e to effect a gain modification corresponding to a smaller dimensional conduit.

Figure 18:
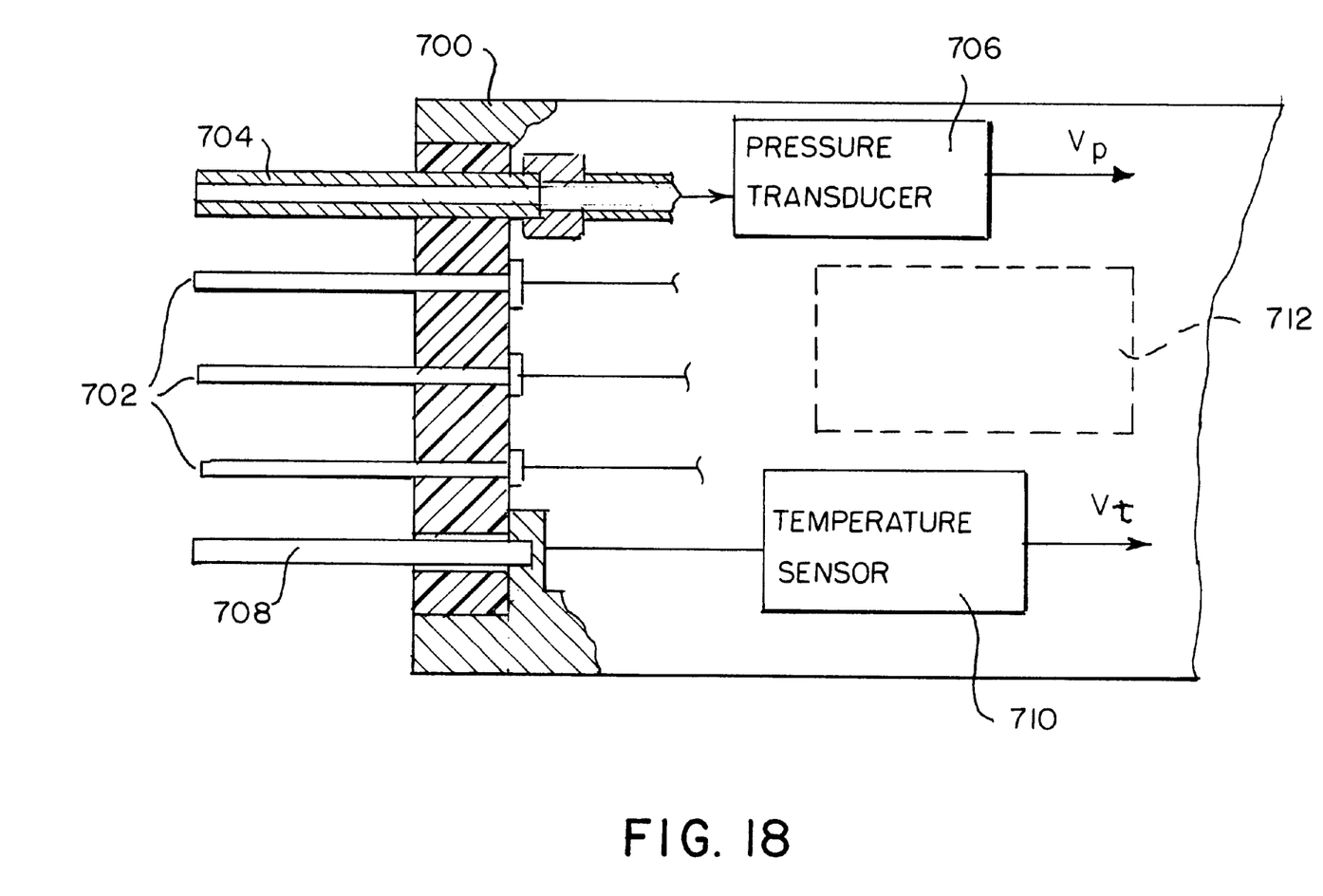
FIG. 18 is a detailed sectional view of a probe having intrusive pressure sensing and temperature sensing intrusive probes, respectively.

As shown by the embodiment of FIG. 18, in addition to the spaced electrodes 702, the probe body 700 carries additional probes for measuring other parameters of the fluid flowing through the conduit. More particularly, the hollow fluid pressure sensing probe 704 is connected with the pressure transducer 706 mounted within the connector body for generating a pressure signal VP, and measuring sensor probe 708 is connected with temperature sensor means 710 that produces the temperature responsive signal Vt. These devices, of course, operate independently of the end-fire flux-producing coil 712.

In each of the embodiments described above, the electrodes have a relatively small size (i.e. a diameter on the order of 0.1 inch) relative to the conventional probe of the prior art shown in FIG. 5. This permits simple manual insertion or removal of the electrodes from the receptor body, the self-sealing resilient glands preventing leakage from the conduit.

Figure 19:
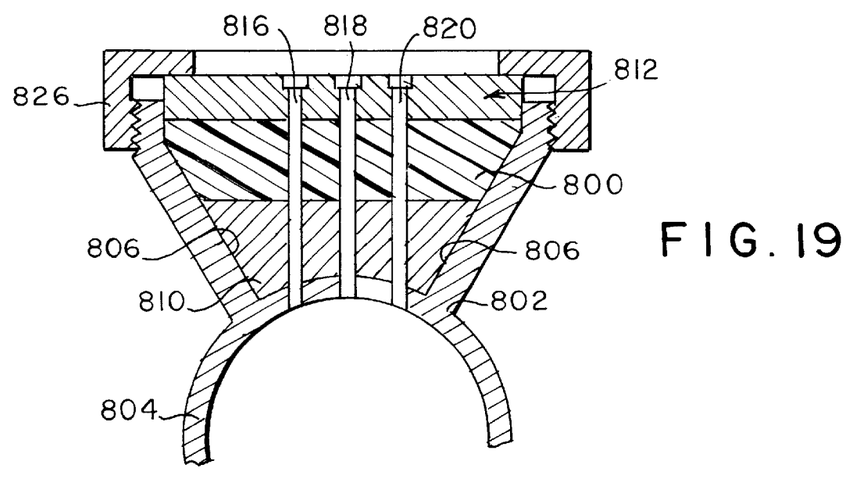
FIG. 19 is a detailed sectional view of a modification of the invention that is sealable by radially inwardly compressible resilient means.

Of course, other arrangements may be provided that do not include self-sealing glands. In the embodiment of FIG. 19, a resilient radially inwardly-compressible gland body 800 is mounted within a chamber contained in the receptor body 802 that is mounted on the conduit 804. The receptor chamber has sloped, converging side walls 806 that are engaged by the gland body 800. The lower surface of the gland body is supported by a stationary support member 8.10, and a rigid operating disk 812 is supported by the upper surface of the gland body. Through passages 816, 818, and 820 for receiving the respective sensing electrodes extend successively through the operating disk 812, the gland body 800, the stationary support 810, and the conduit wall. Annular actuating member 826 is threadably connected with the upper end of the receptor body. Thus, by rotation of the activating rim, the operating disk 812 may be displaced downwardly to effect radial inward compression of the gland body 800, thereby to close the electrode passages 816, 818, and 820, and thus seal the conduit against leakage. To install the electrodes, they are partially inserted within the portions of the passages contained in operating disk 812, whereupon rim 826 is rotated to relieve the forces of compression applied to the gland member 800, resulting in the opening of the electrode passages that extend therethrough. The electrodes may then be inserted further downwardly through the support body 810 and the conduit wall openings so that the tips of the electrodes come into contact with the fluid in the conduit.

Figure 20:
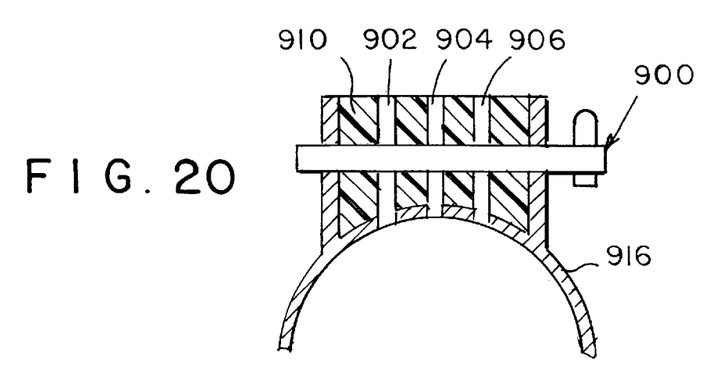
FIGS. 20 and 21 are detailed sectional views of a sealable valve embodiment of the invention in the open and closed position, respectively.
Figure 21:
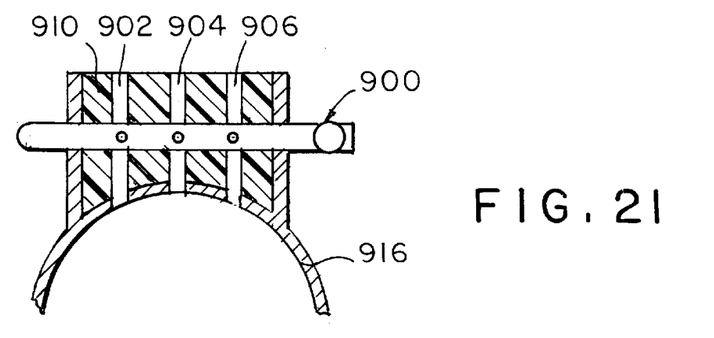

In the embodiment of FIGS. 20 and 21, a rotary shut-off valve 900 is provided for opening and closing the electrode passages 902, 904, 906 that extend through the gland body 910. Thus, when the valve 900 is in the closed position of FIG. 21, the electrodes may be partially introduced into the upper ends of the electrode passages, whereupon the valve 900 may be rotated to the open position of FIG. 20 to permit full insertion of the electrodes to portions in which the tips of the electrodes engage the fluid within the conduit 916.

While in accordance with the provisions of the Patent Statutes the preferred forms and embodiments of the invention have been illustrated and described, it will be apparent that changes may be made without deviating from the inventive concepts set forth above.

What is claimed is:

1. Flow measuring apparatus for measuring the flow of fluid through a portion of a conduit, comprising:
   (a) receptor means arranged transversely externally of the conduit portion, said receptor means containing a plurality of parallel spaced generally-coplanar first gland bores that extend generally radially in circumferentially spaced relation relative to the conduit portion, said gland bores being in communication with the interior of said conduit portion, and a plurality of first resilient normally-closed self-sealable tubular glands arranged in said gland bores respectively said glands containing gland passages, the spacing distance between said gland passages being a function of the cross-sectional area of the conduit portion;
   (b) connector means removably connected with said receptor means, said connector means including:
      (1) a connector body;
      (2) a plurality of parallel first sensing electrodes supported by said connector body, said electrodes extending longitudinally through said sealable gland passages, respectively, when said connector means is connected with said receptor means, said electrodes having first end tip portions that extend within the interior of the conduit portion for direct contact with the fluid that flows therethrough; and
      (3) electromagnet means mounted within said connector body for generating a magnetic field transversely across the conduit portion; and
   (c) flow measuring means connected with said electrodes for measuring the rate of flow through the conduit portion, said flow measuring means including:
      (1) signal processing means connected with said electrodes for generating a flow signal that is a function of the rate of flow of the fluid through the conduit portion; and
      (2) calibrating means for varying said flow signal as a function of the cross-sectional area of the conduit portion.

2. Flow measuring apparatus as defined in claim 1, wherein said electrodes are supported by an electrode support (610) that is removably connected with said connector body.

3. Flow measuring apparatus as defined in claim 2, wherein a plurality of said electrode supports (610, 612) are provided, the electrodes carried by said supports being spaced by distances that correspond with the size of the conduits with which the supports are associated, respectively.

4. Flow measuring apparatus as defined in claim 3, wherein said signal processing means includes a plurality of contacts mounted on said connector body, said electrodes having second end tip portions arranged for engagement with said contacts, respectively.

5. Flow measuring apparatus as defined in claim 4, wherein said calibrating means includes a plurality of contacts the number of which exceeds the number of electrodes, said contacts being spaced for engagement by electrodes that are spaced by distances that correspond with the cross-sectional area of the conduit through which the fluid flow is being measured.

6. Flow measuring means as defined in claim 1, wherein said calibrating means includes calibration factor adjusting means.

7. Flow measuring means as defined in claim 6, and further including manually operable means for adjusting said calibration factor adjustment means as a factor of the cross-sectional area of the conduit.

8. Flow measuring means as defined in claim 6, and further including cooperating code means arranged on said receptor means and said connector means for automatically adjusting said calibration factor adjustment means when said connector means is connected with said receptor means.

9. Flow measuring means as defined in claim 6, and wherein said signal processing means includes reader means for reading on a memory chip embedded in the conduit a characteristic value that is indicative of the cross-sectional area of the conduit.

10. Flow measuring apparatus as defined in claim 1, and further including at least one parameter-sensing second electrode supported by said connector means in adjacent spaced parallel arrangement relative to said first electrodes, said parameter-sensing second electrode extending through a corresponding sealable second gland mounted in a second gland bore parallel with said first gland bore and having a first end tip portion arranged for direct contact with the fluid flowing through the conduit, thereby to supply to said signal processing means a measurement signal that is a function of a physical property of the fluid.

11. Flow measuring apparatus as defined in claim 10, wherein said second electrode senses the temperature of the fluid in the conduit.

12. Flow measuring apparatus as defined in claim 10, wherein said second electrode functions as a part of pressure sensing means for measuring the pressure of the fluid in the conduit.

13. Flow measuring apparatus as defined in claim 1, wherein said receptor means comprises a tubular section that is introduced collinearly between and in communication with axially spaced sections of the fluid conduit.

14. Flow measuring apparatus as defined in claim 1, wherein said receptor means includes a receptor body, and means clamping said receptor body in engagement with the circumferential surface of the conduit, thereby to permit access holes to be drilled into the conduit via said sealable glands, respectively.

15. Flow measuring apparatus for measuring the flow of fluid through a portion of a conduit, comprising:
   (a) receptor means arranged transversely externally of the conduit portion said receptor means including a resilient gland body containing a plurality of parallel normally-open sealable gland passages that extend generally radially in circumferentially spaced relation relative to the conduit portion, said sealable gland passages being in communication with the interior of said conduit portion;
   (b) connector means removably connected with said receptor means, said connector means including:
      (1) a connector body;
      (2) a plurality of parallel first sensing electrodes supported by said connector body, said electrodes extending longitudinally through said sealable gland passages when said connector means is connected with said receptor means, said electrodes having first end tip portions that extend within the interior of the conduit portion for direct contact with the fluid that flows therethrough; and
      (3) electromagnet means mounted within said connector body for generating a magnetic field transversely across the conduit portion; and
   (c) flow measuring means connected with said electrodes for measuring the rate of flow through the conduit portion said flow measuring means including:
      (1) signal processing means connected with said electrodes for generating a flow signal that is a function of the rate of flow of the fluid through the conduit portion; and
      (2) calibrating means for varying said flow signal as a function of the cross-sectional area of the conduit portion: and
   (d) compression means for compressing said gland body to close said gland passages.

16. Flow measuring apparatus for measuring the flow of fluid through a portion of a conduit, comprising:
   (a) receptor means arranged transversely externally of the conduit portion said receptor means including a gland body containing a plurality of parallel gland passages that extend generally radially in circumferentially spaced relation relative to the conduit portion, said gland passages being in communication with the interior of said conduit portion;
   (b) connector means removably connected with said receptor means, said connector means including:
      (1) a connector body:
      (2) a plurality of parallel first sensing electrodes supported by said connector body said electrodes extending longitudinally through said gland passages when said connector means is connected with said receptor means said electrodes having first end tip portions that extend within the interior of the conduit portion for direct contact with the fluid that flows therethrough: and
      (3) electromagnet means mounted within said connector body for generating a magnetic field transversely across the conduit portion: and
   (c) flow measuring means connected with said electrodes for measuring the rate of flow through the conduit portion said flow measuring means including:
      (1) signal processing means connected with said electrodes for generating a flow signal that is a function of the rate of flow of the fluid through the conduit portion: and
      (2) calibrating means for varying said flow signal as a function of the cross-sectional area of the conduit portion: and
   (d) valve means for selectively closing and opening said gland passages.

* * * * *